United States Patent [19]

Webber

[11] Patent Number: 5,446,611
[45] Date of Patent: Aug. 29, 1995

[54] HEAD SUSPENSION ASSEMBLY WHICH INCLUDES A LOAD BEAM ELEMENT HAVING RELIEF CHANNELS

[75] Inventor: Valerie P. Webber, Hutchinson, Minn.

[73] Assignee: Hutchinson Technology, Inc., Hutchinson, Minn.

[21] Appl. No.: 50,517

[22] Filed: Apr. 20, 1993

Related U.S. Application Data

[63] Continuation-in-part of Ser. No. 583,048, Sep. 14, 1990, abandoned.

[51] Int. Cl.⁶ .............................................. G11B 21/21
[52] U.S. Cl. ................................................... 360/104
[58] Field of Search ................................. 360/103–105

[56] References Cited

U.S. PATENT DOCUMENTS

| | | | |
|---|---|---|---|
| 3,668,668 | 6/1972 | Rubitschet | 360/103 |
| 4,268,879 | 5/1981 | Watraus | 323/315 |
| 4,286,297 | 8/1981 | Root et al. | 360/103 |
| 4,724,500 | 2/1988 | Dalziel | 360/103 |
| 4,734,805 | 3/1988 | Yamada | 360/104 |
| 4,757,402 | 7/1988 | Mo | 370/95.3 |
| 4,797,763 | 1/1989 | Levy et al. | 360/104 |
| 4,843,502 | 6/1989 | Tagawa | 360/105 |
| 4,853,811 | 8/1989 | Brooks | 360/103 |
| 4,853,812 | 8/1989 | Daito et al. | 360/104 |
| 4,868,694 | 9/1989 | Hagen | 360/104 |
| 4,894,740 | 1/1990 | Chhabra | 360/103 |
| 4,896,233 | 1/1990 | Yamada | 360/104 |
| 4,954,919 | 9/1990 | Yamada | 360/104 |
| 4,992,898 | 2/1991 | Wanlass | 360/104 |
| 4,996,616 | 2/1991 | Aoyagi et al. | 360/104 |
| 5,012,368 | 4/1991 | Bosier et al. | 360/104 |
| 5,012,369 | 4/1991 | Owe et al. | 360/104 |
| 5,014,144 | 5/1991 | Sato | 360/104 |
| 5,027,241 | 6/1991 | Hatch et al. | 360/105 |
| 5,057,953 | 10/1991 | Wanlass | 360/104 |
| 5,079,660 | 1/1992 | Yumura et al. | 360/104 |
| 5,081,553 | 1/1992 | Wanlass et al. | 360/103 |
| 5,283,704 | 2/1994 | Reidenbach | 360/104 |

FOREIGN PATENT DOCUMENTS

| | | | |
|---|---|---|---|
| 60-167172 | 8/1985 | Japan | 360/104 |
| 63-225981 | 9/1988 | Japan | 360/104 |

Primary Examiner—Robert S. Tupper
Assistant Examiner—Jefferson Evans
Attorney, Agent, or Firm—Faegre & Benson

[57] ABSTRACT

A magnetic head suspension assembly has certain structural improvements to increase head suspension dynamic performance. Load beam planar surfaces near the flexure may have relief channels to avoid interference between the load beam and the flexure arms, to facilitate flexible head gimballing, reduce pitch and roll stiffness, and maintain dimple contact in the plane of the load beam surface. An extended lifter portion at the load beam distal end may extend beyond the flexure. The flexure relief channels may extend to load beam distal end as stiffeners. A length of tubing may be on both longitudinal edges of the load beam improve suspension damping characteristics. One or both tubes may enclose conductors for signals from the magnetic head. A planar protuberance on the flexure tongue may contact a protuberance on the load beam element near the load beam distal end. Alternatively, the planar protuberance contacting surface may be on the load beam element to contact a protuberance on the flexure tongue. A protuberance on the load beam with reverse rails provides improved resonance. Reverse rail stiffening flanges project from load beam edges, and one or both of the stiffening flanges may have cut-away portions at the load beam distal end.

4 Claims, 2 Drawing Sheets

HEAD SUSPENSION ASSEMBLY WHICH INCLUDES A LOAD BEAM ELEMENT HAVING RELIEF CHANNELS

CROSS-REFERENCE TO RELATED APPLICATION

This application is a continuation-in-part of our commonly assigned U.S. Ser. No. 07/583,048, filed Sep. 14, 1990, now abandoned.

BACKGROUND OF THE INVENTION

This invention is directed to an improved magnetic head suspension for use with dynamic magnetic storage apparatus. More particularly, it is directed to a magnetic head suspension assembly that has certain structural improvements to increase the dynamic performance of the head suspension as a whole.

Conventionally available magnetic head suspension assemblies, used for radially accessing different concentric circular data tracks of a rotating magnetic disk, are subject to different forces causing the suspension to pitch about a first axis and roll about a second axis orthogonal to the first axis. The present invention is designed to reduce or minimize the effects of these forces as applied to a head suspension assembly. By forming so-called reverse rails or flanges on the load beam (that is, forming the reinforcing flanges to be directed toward the side of the load beam on which the magnetic head is mounted, rather than toward the opposite side of the load beam, as has been previously been conventional), together with other innovative design improvements, the static and especially the dynamic performance capability of the assembly can be greatly improved. In certain circumstances, as will be further described herein, the innovative design improvements of the present invention provide performance advantages, even when the load beam is formed with rails or flanges which project away from the side of the load beam to which the head is mounted. Additionally, the overall spacing of the disks can be substantially reduced.

BRIEF DESCRIPTION OF THE INVENTION

The magnetic head suspension according to this invention includes a spring load beam element joined to an arm upon which the suspension is to be mounted. The load beam includes stiffening flanges which project from longitudinal edges of the load beam element.

The suspension also includes flexure means joined to the distal end of the load beam element from a point proximally displaced from the distal apex of the load beam element. The flexure means projects beyond the distal apex of the load beam element and has an aperture in the flexure portion to define a pair of outer flexible arms generally parallel to the longitudinal axis of the assembly and a cross leg at the distal end of the flexure piece. The flexure means also includes a flexure tongue joined to the cross leg extending proximally from the cross leg into the aperture with its free end centrally located between the arms.

In addition, planar surfaces of the load beam element in a vicinity of the flexure may be formed with relief channels to avoid interference between the load beam element and the flexible arms of the flexure, thus facilitating flexible gimballing of the magnetic head by reducing pitch and roll stiffness, while maintaining dimple contact in the plane of the load beam surface. The advantages obtained with the use of such flexure relief channels are equally obtained with load beams which have their side rails or flanges oriented either toward or away from the read/write head.

Also, an extended lifter portion may be provided at the distal end of the load beam to extend beyond the flexure. The flexure relief channels can be extended through the length of the extended load beam to act as a stiffener.

Further, a length of tubing may be affixed to both longitudinal edges of the load beam element to improve the damping characteristics of the suspension assembly. Conductors for signals from the magnetic head may be enclosed within one or both lengths of tubing. Load beams formed with rails or flanges oriented either toward or away from the side of the magnetic head may have damping tubing affixed to the longitudinal edges thereof.

The flexure tongue of the flexure portion may be provided with a planar protuberance contacting surface thereon for contacting a protuberance on the load beam element adjacent to the distal end of the planar load beam surface. Alternatively, the planar protuberance contacting surface may be provided on the load beam element for contacting a protuberance on the flexure tongue. It is by providing a protuberance on the load beam in conjunction with reverse rail load beams that performance advantages in terms of resonance are obtained.

The reverse rail stiffening flanges may project from longitudinal edges of the load beam element, and the stiffening flange on one or both side edges of the load beam may have cut-away portions at the distal end of the load beam.

The present invention also provides a manufacturing intermediate for use in manufacturing a flexure and in assembling the flexure to a load beam suspension, the manufacturing intermediate having projecting side tabs projecting outwardly from the flexible arms of the flexure.

DETAILED DESCRIPTION OF THE PREFERRED EMBODIMENT

Figure 1:
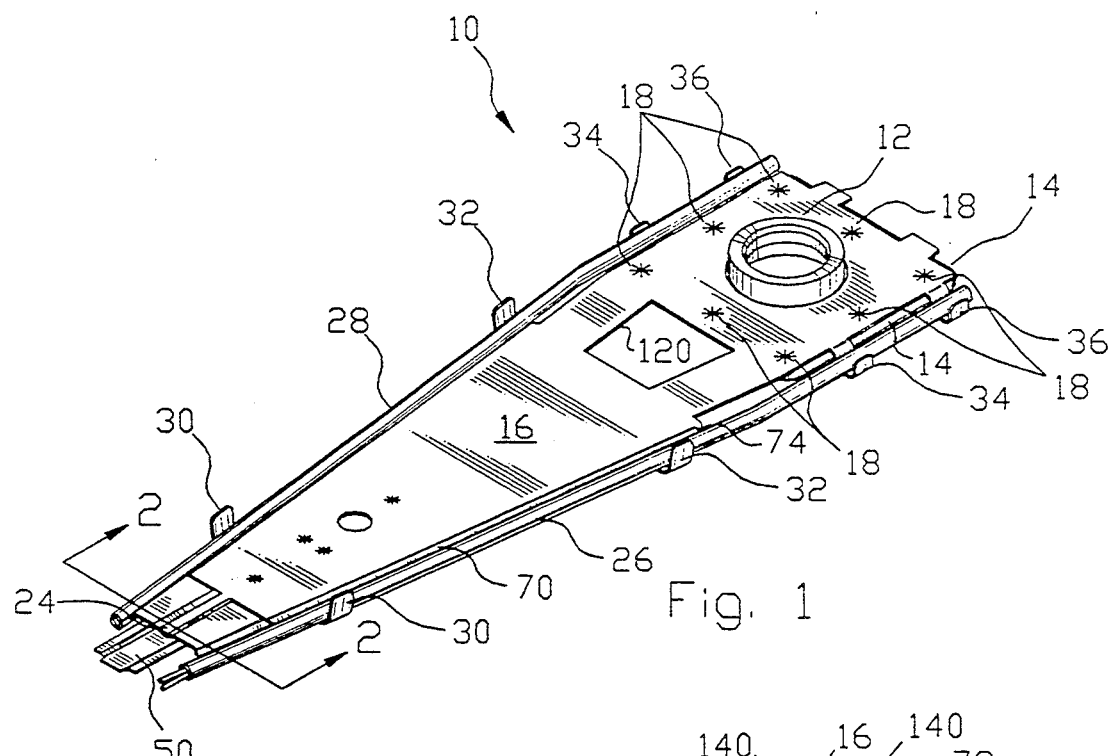
FIG. 1 is a top perspective view of a magnetic head suspension assembly in accordance with this invention, with damping tubes along longitudinal edges of the load beam.

Referring now to the drawings, FIG. 1 illustrates a form of a magnetic head suspension assembly formed in accordance with the teachings of this invention. Generally, the magnetic head suspension assembly according to the invention is of the type known within the industry as a Watrous suspension system of the type described by U.S. Pat. Nos. 3,931,641 and 4,167,765. For a more detailed discussion of the structure and use of Watrous suspension systems and disk drive systems generally, reference is made to these two patents, which are specifically incorporated by reference into the disclosure of this application for that purpose.

Referring now to FIG. 1, head suspension is generally designated as 10. Suspension 10 is mounted on a rigid arm of an actuator for a magnetic disk drive utilizing swaging boss 12 which projects upwardly from base plate 14 which is positioned against the bottom planar surface of load beam element 16. Welds 18 secure base plate 14 to the bottom surface of load beam 16. The swaged connection of load beam 16 to a rigid arm, which may be part of an assembly of rigid arms known as an E-block, is well-known in the industry and not described further herein. Alternatively, other base plate structures can be utilized which provide for securing load beam 16 to the mounting arm utilizing screws, welding, bonding or any other suitable connection means.

As shown in FIG. 1, load beam element 16 is preferably formed from sheet stainless steel, preferably a hard or 300 series alloy, having a nominal sheet thickness between 0.002 and 0.004 inches.

Beam element 16 has top and bottom planar surfaces which have a width at the proximal end, adjacent to the arm, which is approximately equal to the width of the arm and then tapers to a second width at distal apex 24. Beam element 16 is resilient at its proximal end, adjacent to base plate 14, but is substantially rigid for its remaining length. The rigidity is enhanced by providing, in the embodiment of the invention illustrated in FIGS. 1-6 and 8, stiffening flanges 70 which are oriented to project downwardly as viewed in FIG. 1, that is, toward the side of load beam element 16 to which a magnetic head is to be bonded.

The vibrational damping characteristics of beam element 16 are enhanced by providing tubing sections 26 and 28 which are secured to beam element 16 and the stiffening flanges 70 by tube capture tabs or wire guides 30, 32, 34 and 36 positioned on opposite edges of the planar surface of load beam element 16 as shown in FIG. 1.

In the structure shown in FIG. 1, tubing sections 26 and 28 are secured to load beam element 16, utilizing wire captures 30, 32, 34 and 36 in particular, to provide a high degree of damping for the first torsional resonance mode of load beam 16 which is swaged to an E-block. A typical load, a magnetic head (not shown), is mounted at and below distal apex 24 of load beam element 16.

As shown in FIG. 1, flexure piece 50 is affixed to distal apex 24 of load beam element 16 by welds 42 to join it to the bottom planar surface of element 16. Load beam element 16 has load beam cut-out or aperture 120 removed from the surface at the proximal end of the tapered portion between termination point 74 of flanges 70 and base plate 14. The removal of the sheet material of load beam element 16 in the vicinity of the base plate allows load beam element 16 to be quite resilient in the vicinity of its proximal end, while, because of the stiffening effect of flanges 70, it is also relatively rigid for its remaining length.

Figure 2:
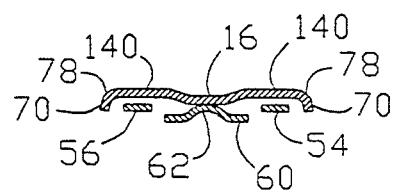
FIG. 2 is a cross-sectional view of the distal apex portion of the load beam of FIG. 1 taken along section line 2—2 of FIG. 1.

FIG. 2 is a sectional view of apex 24 of load beam element 16 of FIG. 1 showing downwardly projecting flanges 70 and single bend radii 78 and also showing embossed or relieved section 140 which minimizes interference between flexure tongue 60 which contacts beam element 16 at dimpled projection 62 as shown. Clearance is thus provided for flexible arms 54 and 56 of flexure piece 50. In addition to providing additional clearance for the flexure arms 54 and 56, relieved portion 140 also provides a certain amount of stiffening of load beam element 16 in the vicinity of apex 24. Relief 140 can either be etched or formed in the load beam in order to provide for free motion of the arms.

Figure 3:
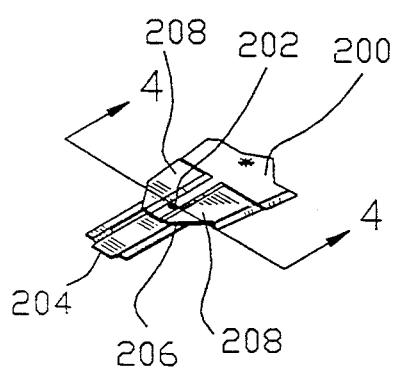
FIG. 3 is a fragmentary view of the end of the load beam, similar to that of FIG. 1, but showing a dimpled load beam.
Figure 4:
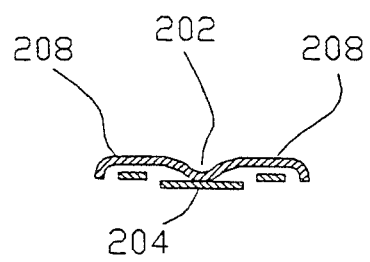
FIG. 4 is a cross-sectional view of the distal apex portion of the load beam of FIG. 3 taken along section line 4—4 of FIG. 3.

FIG. 3 is a fragmentary view of the distal apex end of load beam 200, similar to that of FIG. 1, but showing load bearing dimple 202 formed on load beam 200, rather than on flexure 204. The apex end of load beam 200 is cut away along lines 206, and relieved areas 208 in load beam 200 are also provided. FIG. 4 is a side view of an assembly in accordance with FIG. 3. It is to be understood that any of the embodiments described herein may be alternatively formed with the load bearing dimple formed on with the load beam or on the flexure. However, performance advantages for the head suspension assembly as a whole are noted only when the dimple is formed on the load beam and the load beam itself is formed with reverse rails, extending toward the side of the load beam to which the read/write head is bonded.

Figure 5:
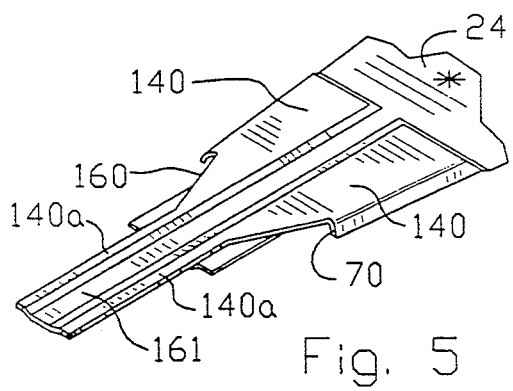
FIG. 5 is an expanded detail view of the distal apex of a load beam of the type shown in FIG. 1 wherein the distal portion of the beam is extended and relieved and the stiffening flange and a portion of the beam is cut away.
Figure 5A:
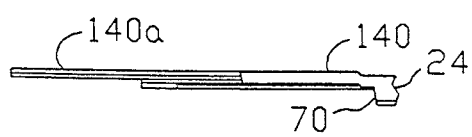
FIG. 5A is a side elevation view of the detail shown in FIG. 5.

FIG. 5 shows another variation of the embodiments illustrated generally in FIGS. 1 and 2. In FIG. 5, the apex end of the load beam is cut away along lines 160 to provide additional lifting surface 161 beyond the head. Relieved areas 140a in the load beam extension are also provided. FIG. 5A is a side view of an assembly in accordance with FIG. 5.

Figure 6:
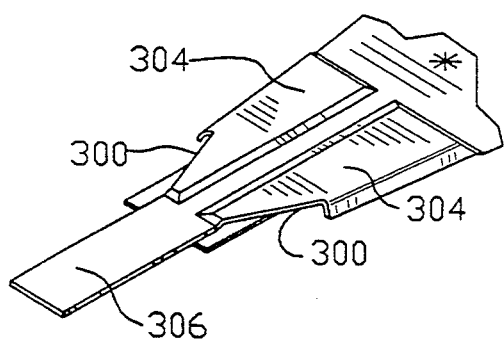
FIG. 6 is a fragmentary end view of the load beam of FIG. 1, with an extended load beam having relief sections only over the flexure arms.

FIG. 6 shows a variation of the embodiment of FIGS. 5 and 5A, in which the apex end of the load beam is cut away along lines 300. Relieved areas 304 are provided in the load beam adjacent cut away lines 300, but distal end lifting surface 306 of the load beam is planar.

Figure 7:
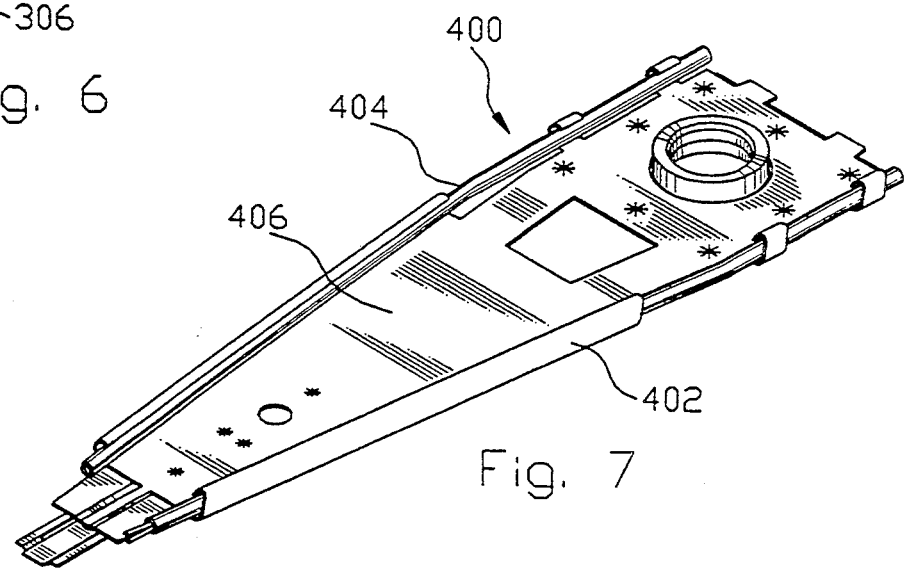
FIG. 7 is a top perspective view of another magnetic head suspension assembly in accordance with this invention, with load beam rails oriented away from the read/write head and damping tubes along longitudinal edges of the load beam.

FIG. 7 is a top perspective view of another magnetic head suspension assembly 400 in accordance with this invention, with load beam flanges or rails 402 oriented away from the read/write head and damping tubes 404 along longitudinal edges of load beam 406. The various other features of head suspension assembly 400 as have been described above with regard to FIG. 1. It is to be understood that any of the embodiments described herein may be alternatively formed with the load beam rails or flanges oriented toward or away from the read/write head.

Figure 8:
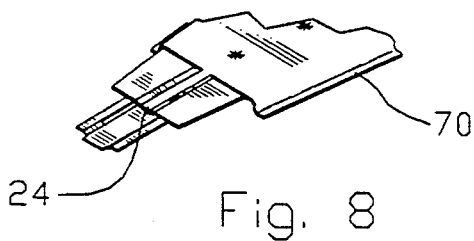
FIG. 8 is a fragmentary end view of a magnetic head suspension assembly similar to that shown in FIG. 1, with damping tubes removed and showing the side rails cut back.

FIG. 8 is a fragmentary end view of a magnetic head suspension assembly similar to that shown in FIG. 1, with damping tubes removed and showing side rails or flanges 70 cut back from distal apex 24 of load beam 16. Cut back rails are preferably formed, as illustrated in FIG. 8, with a load beam formed with reverse rails.

Figure 9:
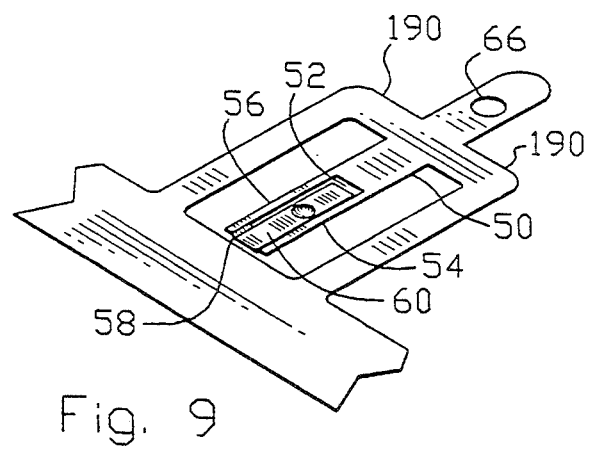
FIG. 9 is a perspective view of a flexure for use in the present invention as it may be manufactured with side tabs.

In FIG. 9, a preferred embodiment for the manufacture of the flexure piece is shown. Flexure piece 50 is etched with flexure side tabs 190 which attach to the body of the flexure between aperture 52 which is bounded by flexible arms 54 and 56 and tooling hole 66. If flexure piece 50 is formed using side tabs 190 located in the position shown in FIG. 9, rather than utilizing end tabs projecting from cross beam 58, there is less chance that flexure piece 50 will be damaged during the manufacturing process and a higher parts yield will result.

What is claimed is:

1. A magnetic head suspension for attachment to a rigid arm, said head suspension comprising, in combination:
   (a) a spring load beam element joined to the arm at a proximal end of the load beam element and having stiffening flanges which project from longitudinal edges of the load beam element;
   (b) a gimballed flexure means joined to the load beam element near a distal end of the load beam element from a point on a planar surface of the load beam element proximally displaced from a distal apex of the load beam element;
   and wherein planar surfaces of the load beam element in a vicinity of the flexure means have relief channels embossed thereupon constructed and arranged to avoid interference between the load beam element and flexible arms of the flexure means for facilitating flexible gimballing of a magnetic head to be attached thereto by reducing pitch and roll stiffness while maintaining dimple contact in a plane of the load beam surface.

2. A magnetic head suspension according to claim 1, wherein the stiffening flanges are oriented to project toward a side of the load beam element to which the magnetic head is to be mounted.

3. A magnetic head suspension for attachment to a rigid arm, said head suspension comprising, in combination:
   (a) a spring load beam element joined to the arm at a proximal end of the load beam element;
   (b) a gimballing flexure means joined to the load beam element near a distal end of the load beam element from a point on a planar surface of the load beam element proximally displaced from a distal apex of the load beam element;
   wherein an extended lifter portion is provided at the distal end of the load beam extended beyond the flexure means, and wherein planar surfaces of the load beam element in a vicinity of the flexure means have relief channels embossed thereupon constructed and arranged to avoid interference between the load beam element and flexible arms of the flexure means to facilitate flexible gimballing of a magnetic head to be attached thereto, by reducing pitch and roll stiffness while maintaining dimple contact in a plane of the load beam.

4. A magnetic head suspension according to claim 3, wherein the relief channels extend to the distal end of the extended lifter portion of the load beam to further provide load beam stiffening.

* * * * *